US012310898B2

(12) United States Patent
Davis et al.

(10) Patent No.: US 12,310,898 B2
(45) **Date of Patent: *May 27, 2025**

(54) LIGHTWEIGHT CASKET LID AND CASKET LID ASSEMBLY

(71) Applicant: Vandor Group, Inc., Richmond, IN (US)

(72) Inventors: Justin F. Davis, Richmond, IN (US); Gerald H. Davis, Fountain City, IN (US)

(73) Assignee: Vandor Group, Inc., Richmond, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,762

(22) Filed: Oct. 16, 2023

(65) Prior Publication Data

US 2024/0041685 A1 Feb. 8, 2024

Related U.S. Application Data

(63) Continuation of application No. 17/474,550, filed on Sep. 14, 2021, now Pat. No. 11,786,433.

(51) Int. Cl.
*A61G 17/007* (2006.01)
*A61G 17/02* (2006.01)

(52) U.S. Cl.
CPC ......... *A61G 17/0073* (2013.01); *A61G 17/02* (2013.01)

(58) Field of Classification Search
CPC .... A61G 17/0073; A61G 17/02; A61G 17/00; A61G 17/004; A61G 17/034; A61G 17/042
See application file for complete search history.

(56) References Cited

U.S. PATENT DOCUMENTS

| | | | |
|---|---|---|---|
| 1,976,538 | A | 10/1934 | Benbough |
| 2,974,390 | A | 3/1961 | Sydney |
| 2,976,599 | A | 3/1961 | Overland et al. |
| 3,233,302 | A | 2/1966 | Ross |
| 3,781,948 | A | 1/1974 | Pitt |
| 3,810,281 | A | 5/1974 | Ferber |
| 4,730,370 | A | 3/1988 | Elder |
| 4,773,134 | A | 9/1988 | Kay |
| 4,944,076 | A | 7/1990 | Kay et al. |
| 4,967,455 | A | 11/1990 | Elder |
| 5,307,545 | A | 5/1994 | Stoltz |
| 6,574,841 | B1 | 6/2003 | Vosahlik et al. |
| 6,849,141 | B2 | 2/2005 | Buchler et al. |
| 7,003,855 | B2 | 2/2006 | Lew |

(Continued)

*Primary Examiner* — William L Miller
(74) *Attorney, Agent, or Firm* — Maginot, Moore & Beck LLP

(57) ABSTRACT

A casket lid includes a lid body that extends partially over a casket body configured to receive a human body in supine position, the lid body having a first side configured to extend along a portion of a first casket body side, a second side configured to extend along a portion of a second casket body side, a first end configured to extend along a first casket body end, and an open end. A skirt assembly includes a substrate having a top edge, and further includes at least one sheet of flexible material affixed to and extending over the top edge and downward from the substrate. The sheet of flexible material extends to or below a vertical level of a lowest portion of at least one of the first side and the second side.

20 Claims, 7 Drawing Sheets

(56) References Cited

U.S. PATENT DOCUMENTS

| | | | |
|---|---|---|---|
| 7,594,306 | B2 | 9/2009 | Beaulne et al. |
| 8,595,908 | B2 * | 12/2013 | Cox ........................ A61G 17/02 27/14 |
| 9,056,040 | B2 | 6/2015 | Gesell et al. |
| 9,629,773 | B2 * | 4/2017 | Ozbun ..................... B27N 5/00 |
| 9,649,241 | B2 | 5/2017 | Cox et al. |
| 10,583,060 | B2 | 3/2020 | Reynolds et al. |
| 2010/0313396 | A1 | 12/2010 | Cox et al. |
| 2012/0304428 | A1 * | 12/2012 | Ozbun ..................... B27N 5/00 156/196 |
| 2013/0167336 | A1 | 7/2013 | Boots et al. |
| 2023/0390138 | A1 * | 12/2023 | Davis ................... A61G 17/007 |
| 2023/0404832 | A1 * | 12/2023 | Davis ................. A61G 17/0106 |

* cited by examiner

LIGHTWEIGHT CASKET LID AND CASKET LID ASSEMBLY

This application is a continuation of U.S. patent application Ser. No. 17/474,550, filed Sep. 14, 2021, now U.S. Pat. No. 11,786,433, the contents of which are incorporated herein by reference in their entirety.

FIELD OF THE INVENTION

The present invention relates to caskets.

BACKGROUND OF THE INVENTION

Caskets can be employed for display, interment and cremation of a deceased. Because of the display aspect, a casket ideally conveys dignity and respect for the deceased. To accomplish the foregoing, it is known to manufacture caskets from hardwoods and metal materials, and providing them with decorative features. However, the cost of such caskets can be beyond the reach of many.

Accordingly, caskets formed of corrugated paperboard and/or manufactured wood products have been developed. Such products can be manufactured at a much lower cost than the hardwood and metal caskets, and can be aesthetically pleasing. However, significant costs remain in both material and shipment of caskets made from lower cost materials.

To address such concerns, prior developments have resulted in corrugated caskets that include lids that can nested into the casket body for shipment. U.S. Pat. No. 8,595,908 discloses, among other things. a casket assembly that employs a domed casket lid, formed of corrugated cardboard, that may be inverted and shipped within the casket body to reduce shipment volume.

There is nevertheless always a need to further reduce costs, for example, in material, assembly and/or shipping costs.

SUMMARY OF THE INVENTION

The embodiments described herein address at least some of the above-stated needs, as well as others, by providing a lightweight casket lid that has employs a paper bridge formed from a folded corrugated paper blank.

DETAILED DESCRIPTION

Figure 1:
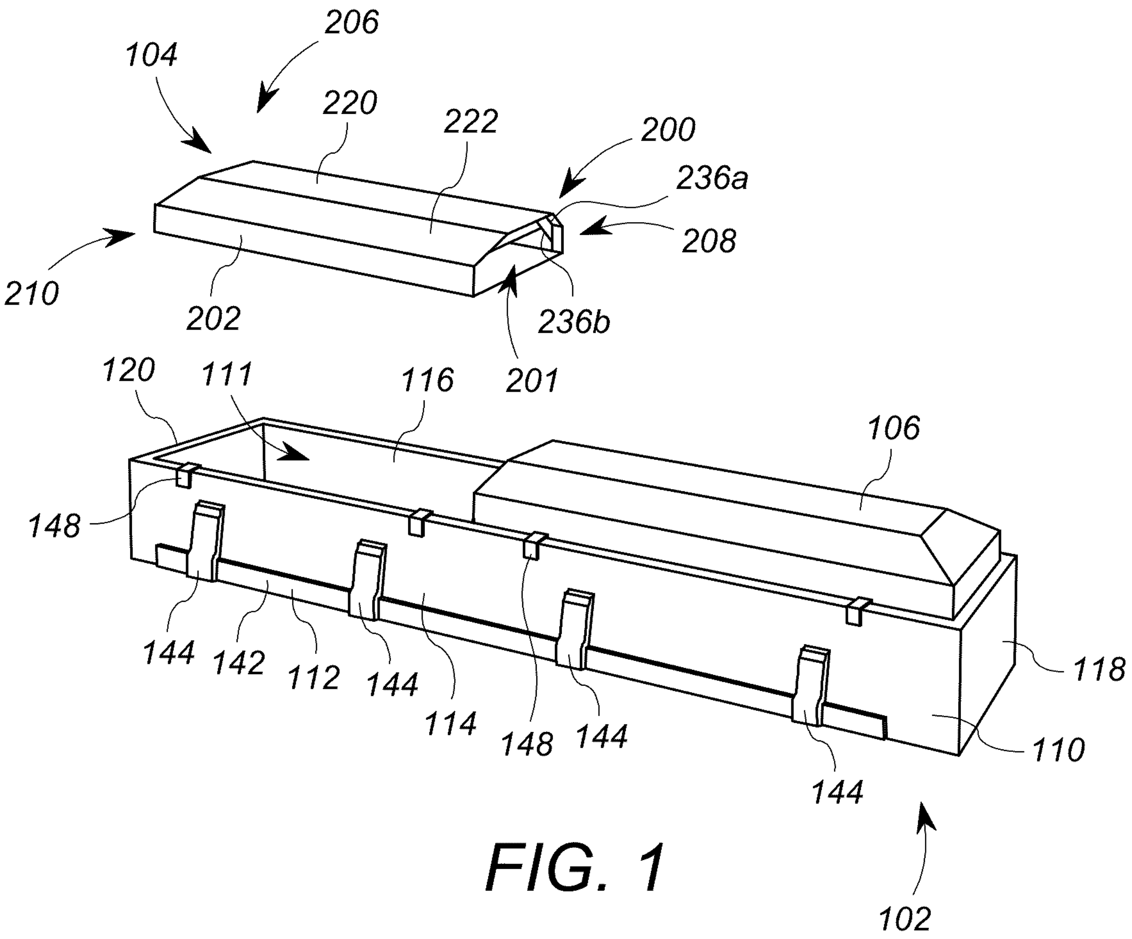
FIG. 1 shows a perspective view of an exemplary casket that incorporates aspects of the disclosure.

FIG. 1 shows a perspective view of an exemplary casket 100 that incorporates inventive features. The casket 100 includes a body assembly 102 and first and second lids 104 and 106, respectively. As shown in FIG. 1, the body assembly 102 in this embodiment includes a casket body 110 and a handle assembly 112. The body assembly 102 further includes interior features not shown in FIG. 1.

Figure 2:
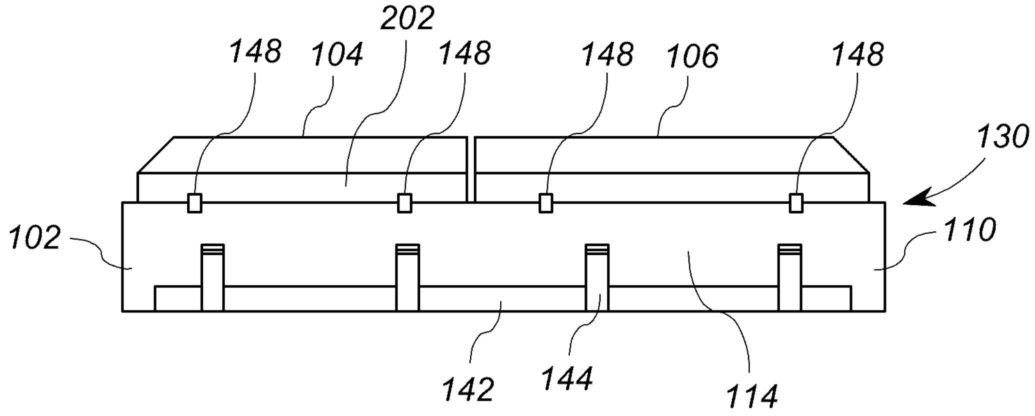
FIG. 2 shows a side plan view of the casket of FIG. 1 in the closed position.

In FIG. 1, the first lid 104 is removed to reveal a portion of the interior 111 of the casket body 110. It will be appreciated that the first lid 104 and the second lid 106 may be essentially identical in construction. In some cases, the first lid 104 and second lid 106 can be essentially identical in construction except for their respective lengths, which may differ from each other as a matter of preference. FIG. 2 shows a side plan view of the casket 100 with both the first lid 104 and the second lid 106 in the closed position.

With reference to FIGS. 1 and 2, the casket body 110 includes a first side wall 114, a second opposite side wall 116, a first end wall 118, a second opposite end wall 120, and a bottom panel. The bottom panel is not shown in FIG. 1, but is generally located at the bottom of casket body 110. The first side wall 114 and the second side wall 116 have elongated sides compared to the end walls 118, 120, such that the side walls 114, 116 and end walls 118, 120 define, respectively the sides and ends of a substantially rectangular box. The bottom panel extends between and intersects with both side walls 114 and end walls 116 to form the open-topped box structure 110. The side walls 114, 116 and end walls 118, 120 are preferably formed from at least two layers of kraft paper or corrugated paper, but could have other construction. The bottom panel is similarly formed at least in part by kraft or corrugated paper. However, the bottom panel may also include a plywood or particle board reinforcement.

The first side wall 114, the second side wall 116, the first end wall 118, the second opposite end wall 120, and the bottom panel, are sized and configured to reasonably fit or contain a human body in supine position. It will be appreciated that the height of the walls 114, 116, 118 and 120 define a casket body top level 130 such that a portion of a deceased may extend above the casket body top level 130. As will be discussed below, the reduced height reduces shipping costs, and allows for better viewing of the face of the deceased during funereal events. As also discussed below, the lids 104, 106 are constructed to extend above the top level 130 to contain any portion of the deceased that extends above the casket body top level 130.

To this end, the lids 104, 106 have a smaller horizontal footprint than the casket body 110, and can be inverted and placed within the casket body 110 for shipment or storage. When the stored body 110 and lids 104, 106 are ready for use to contain a deceased, the lids 104, 106 are removed from within the casket body 110. During use, the lids 104, 106 are supported at least in part above the top level 130 by a series of clips 148. The clips 148 hook onto the walls 114, 116, and have a receptacle for receiving the bottom edges of the lids 104, 106, thereby supporting the lids 104, 106.

The handle assembly 112 in this embodiment includes a bar 142 and a plurality of rotatable hinge assemblies 144. In general, the handle assembly 112 is configured such that the bar 142 can rotate partly upward and outward to facilitate carrying of the casket 100. Further details regarding a suitable embodiment of the handle assembly 112 and the clips 148 are provided in U.S. Pat. No. 8,595,908, which is incorporated herein by reference in its entirety. It will be appreciated that some embodiments can employ no handle at all, or a different handle configuration, and still obtain advantages described herein. Other configurations can include cutout holes in the side of the walls 114, 116, similar to those shown in U.S. Pat. No. 10,500,117.

Figure 3:
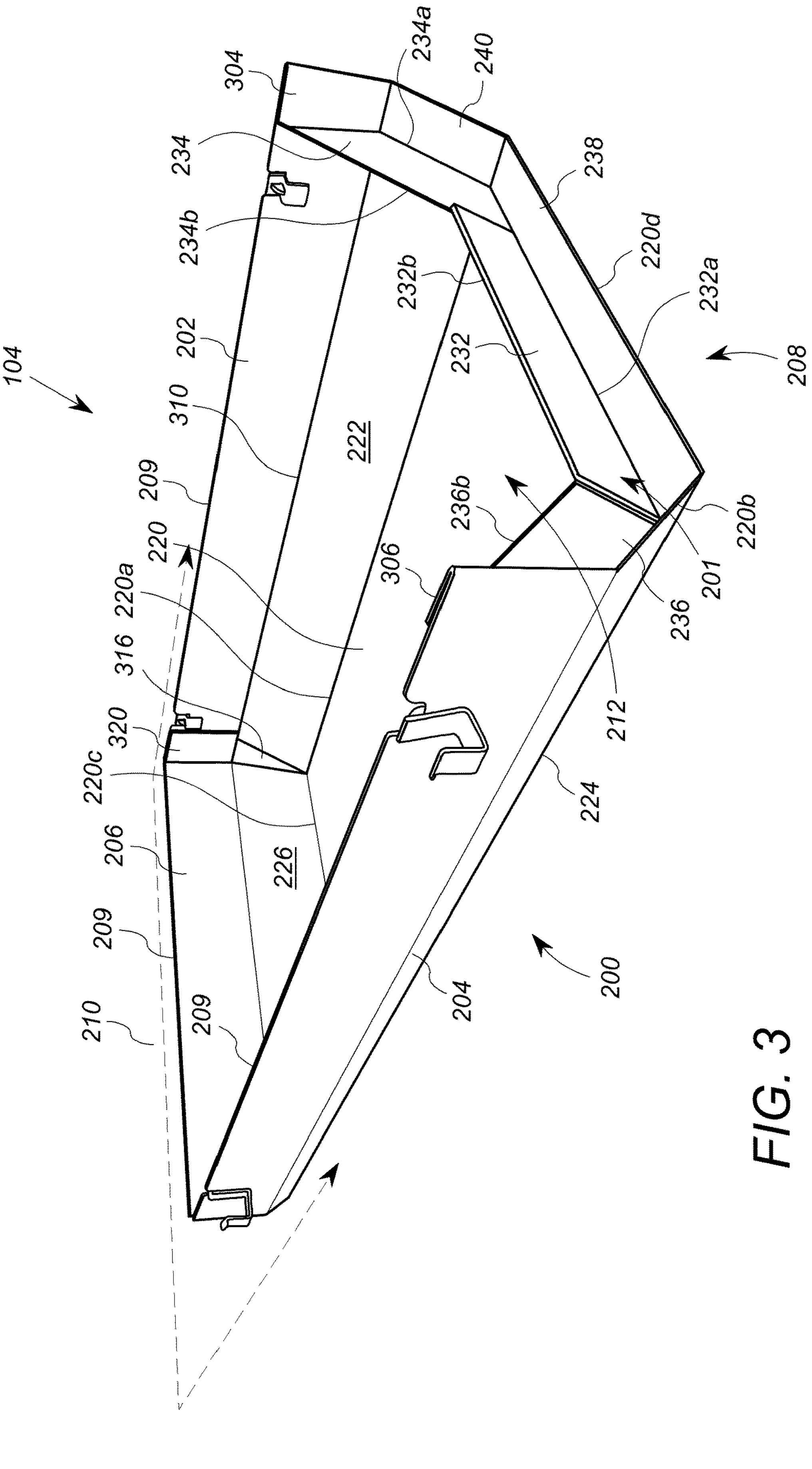
FIG. 3 shows a perspective bottom view of an exemplary lid that may be used in the casket of FIG. 1.
Figure 4:
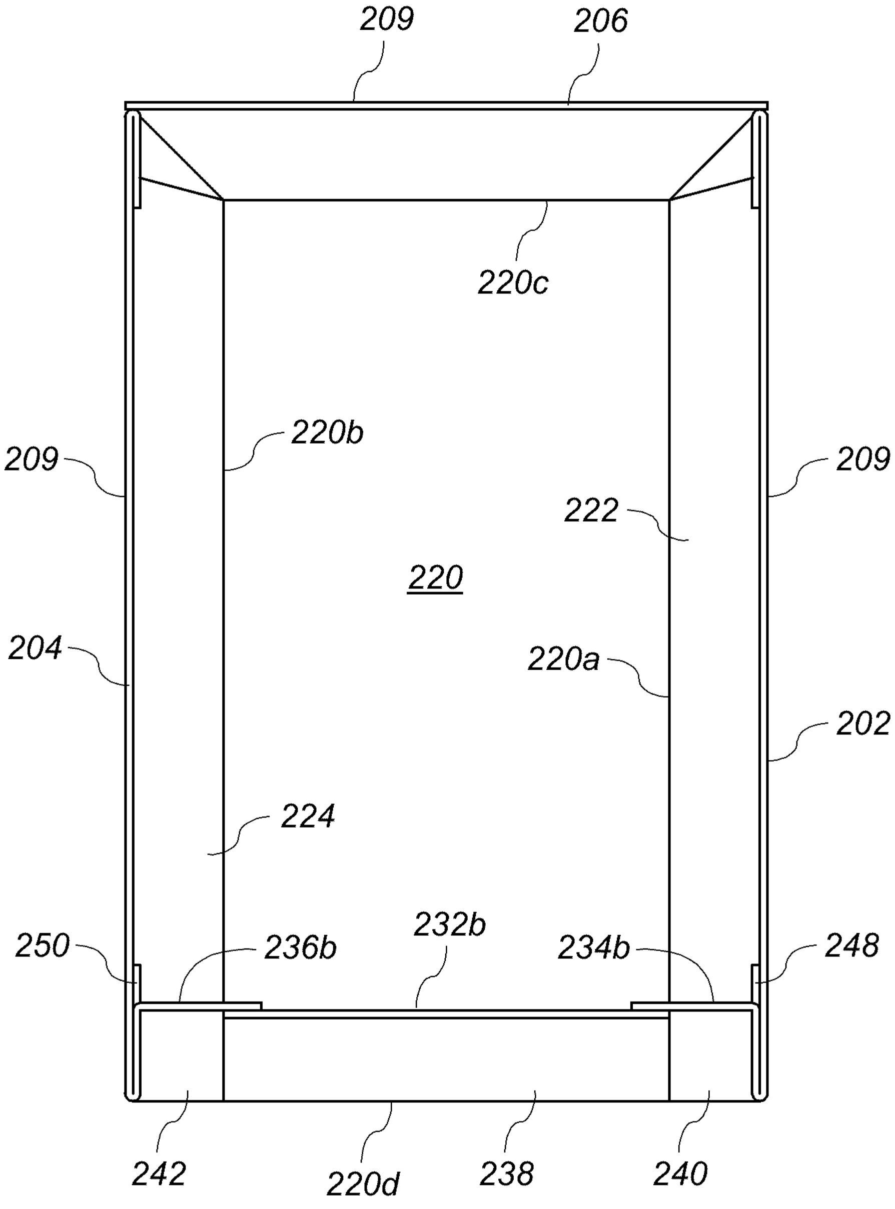
FIG. 4 shows a bottom plan view of casket lid of FIG. 3.
Figure 5:
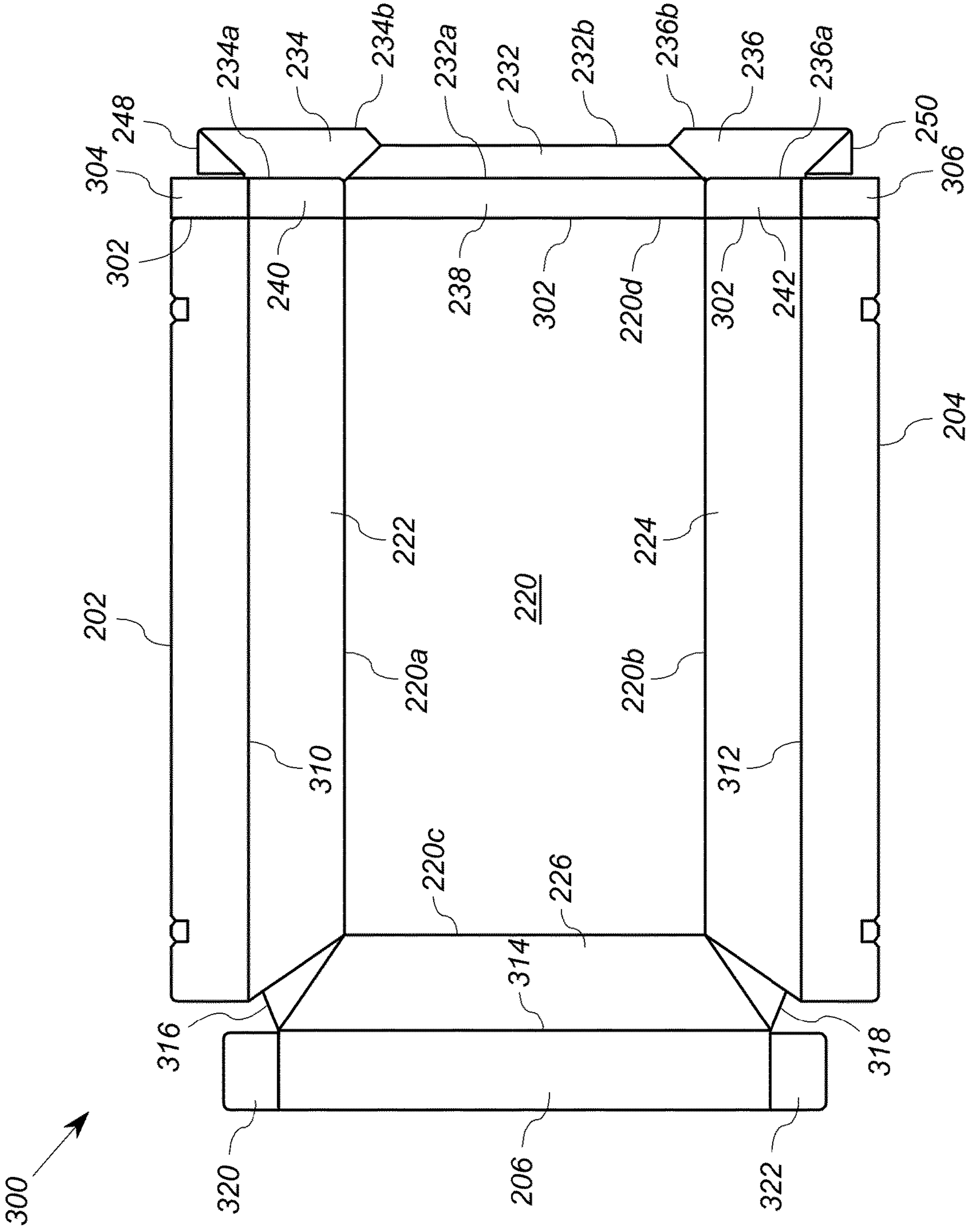
FIG. 5 shows a plan view of a corrugated paper blank that may be used to construct the casket lid of FIG. 3.

In general, each of the first and second lids 104, 106 is formed primarily from corrugated paper or Kraft paper. In this embodiment each of the first and second lids 104, 106 is formed from a folded corrugated blank. In further detail, FIG. 3 shows a perspective view of the underside of the first lid 104, and FIG. 4 shows a bottom plan view of the first lid 104. FIG. 5 shows a corrugated paper blank 300 from which the first lid 104 (and second lid 106) may be constructed.

It will be appreciated that unless otherwise stated, references to directional terms, including but not limited to, vertical, horizontal, upward, downward, top, and bottom, are made with respect to the condition that the first lid 104 and second lid 106 are disposed on the casket in closed position, as shown in FIG. 2, with the casket body 110 placed horizontally in its normal use position.

As discussed above, the first lid 104 is configured to extend partially over the interior of the casket body 110, as shown in FIG. 2. The second lid 106 complementarily extends over the rest of the interior of the casket body as shown in FIGS. 1 and 2. With specific reference to FIGS. 3 and 4, the first lid 104 includes a lid body 200 and a bridge 201. In this embodiment the lid body 200 and bridge 201 are both formed from the corrugated paper blank 300.

The lid body 200 includes a first side 202, a second side 204, a first end 206 and an open end 208. The first side 202 is a panel or wall configured to extend along a portion of the first side wall 114 of the casket body 110 when the first lid 104 is assembled onto the casket body 110 in closed position (FIG. 2). The second side 204 is likewise a panel or wall of the lid body 200 configured to extend along a portion of the second side wall 116 in closed position. The first end 206 is a panel or wall configured to extend along the first end wall 118 in closed position, and the open end 208 is sized to extend over an intermediate portion of the casket body 110 disposed between the first end 118 and the second end 120 in the closed position.

As will be discussed below in further details, the bottom edges 209 of at least two of the first side 202, second side 204, and first end 206 define a lid body bottom plane 210. Although the bottom edges 209 of the first side 202, second side 204, and the first end 206 all lie in the lid body bottom plane 210 in this embodiment, it will be appreciated that the bottom edges 209 at least two of the first side 202, second side 204, and first end 206 can define the lid body bottom plane 210 even if the bottom edges in other embodiments have discontinuities such that portions of the bottom edges do not lie in the plane 210.

As discussed above, the bridge 201 is formed from the folded corrugated paper blank 300 (see FIG. 5). In the assembled first lid 104, the bridge 201 extends downward from the lid body 200 intermediate of the first end 206 and the open end 208. In other embodiments the bridge 201 extends down at the open end 208. In any event, the bridge 201 defines a concave opening 212 extending above the lid body bottom plane 210. The concave opening 212 provides room for the torso of the deceased, not shown, when in the closed position, while also providing the structural reinforcement of a cross-bracing or rib.

In this embodiment, the lid body 200 further includes a top panel 220, a first inclined panel 222, a second inclined panel 224, and a third or end inclined panel 226. Each of the first side 202, the second side 204, and the first end 206 extend vertically, and the top panel 220 extends horizontally. As best shown in FIG. 4, the top panel 220 is rectangular, and includes peripheral edges 220*a*, 220*b*, 220*c* and 220*d*.

With continued reference to both FIG. 3 and FIG. 5, the first inclined panel 222 extends between, and is foldably connected to, the first side 202 and a first edge 220*a* of the top panel 220. The first inclined panel 222 inclines inward and upward from the top of the first side 202 and to the first edge 220*a*. Similarly, the second inclined panel 224 extends between, and is foldably connected to, the second side 204 and a second edge 220*b* of the top panel 220. The second inclined panel 224 inclines inward and upward from the top of the second side 204 and to the second edge 220*b*. Analogously, the third or end inclined panel 226 extends between, and is foldably connected to, the first end 206 and the third edge 220*c* of the top panel 220. The fourth edge 220*d* of the top panel 220 extends between the second edge 220*b* and third edge 220*c*.

The bridge 201 is disposed and extends between the first side 202 and the second side 204, and is disposed near or at the open end 208, or another point between the first end 206 and the open end 208. At least a part of the bridge 201 extends from the top panel 220 to a point above the lid body bottom plane 210.

In this embodiment, the bridge 201 includes a first flap 232, a second flap 234, and a third flap 236. The first flap 232 extends down from an underside 220*e* of the top panel 220 to a location above the lid bottom plane 210. To this end, the first flap 232 is foldably coupled to the lid body 200 via an intermediate first folded portion 238. The intermediate first folded portion 238 in this embodiment is foldably connected on one side to the top panel 220, and on the other side to the first flap 232. The intermediate first folded portion 238 extends in a planar-parallel manner with, and abutting, the top panel 220, such that the fold between the portion 238 and the top panel 220 is substantially 180°. The first flap 232 extends downward at a 90° angle from the intermediate first folded portion 238 toward the casket body interior. The first flap 232 thus has an upper edge 232*a* defined by the fold line between itself and the intermediate first folded portion 238, and a lower edge 232*b* defining at least a portion of the concave opening 212. The lower edge 232*b* extends to a point above the casket lid bottom plane 210 such that when in the closed position, there is additional room above the top of the casket body 110 and below the lower edge 232*b* for the torso of the deceased.

The second flap 234 is foldably coupled to the lid body 200 via an intermediate second folded portion 240. The intermediate second folded portion 240 in this embodiment is foldably connected on one side to the first inclined panel 222, and on the other side to the second flap 234. The intermediate second folded portion 240 extends in a planar-parallel manner with, and abutting, the first inclined panel 222, such that the fold between the portion 240 and the panel 222 is substantially 180°. The second flap 234 extends at a 90° angle from the intermediate second folded portion 240 angularly downward (toward the casket body interior). The second flap 234 thus has an upper edge 234*a* defined by the fold line between the second flap 234 and the intermediate second folded portion 240, and a lower edge 234*b* defining a portion of the concave opening 212. In this embodiment, the second flap 234 is further foldably connected to an end tab 248 that extends from outer edge of the second flap 234.

(See also FIG. 5). The end tab 248 extends along and is secured to the interior surface of the first side panel 202. The end tab 248 may be secured to the first side panel 202 by hot melt adhesive, double sided tape, and/or other coupling mechanisms. At least a part of the second flap 234 overlaps a portion of the first flap 232, and is preferably affixed thereto, for example, by hot melt adhesive, double-sided tape, mechanical fasteners or other suitable means.

The third flap 236 is not visible in FIG. 3, but is shown in FIGS. 4 and 5. With reference to FIGS. 3, 4 and 5, the third flap 236 is foldably coupled to the lid body 200 via an intermediate third folded portion 242. The intermediate third folded portion 242 in this embodiment is foldably connected on one side to the second inclined panel 224, and on the other side to the third flap 236. The intermediate third folded portion 242 extends in a planar-parallel manner with, and abutting, the second inclined panel 224, such that the fold between the portion 242 and the panel 224 is substantially 180°. The third flap 236 extends in a 90° angle from the intermediate third folded portion 242 downward (toward the casket body interior 111). The third flap 236 thus has an upper edge 236*a* defined by the fold line between the third flap 236 and the intermediate third folded portion 242, and a lower edge 236*b* defining a portion of the concave opening 212. (See also FIG. 1). In this embodiment, the third flap 236 is further foldably connected to an end tab 250 that extends from outer edge of the third flap 236. The end tab 250 extends along and is secured to the interior surface of the second side panel 204. The end tab 250 may be secured by hot melt adhesive, double sided tape, and/or other coupling mechanisms. At least a part of the third flap 236 overlaps a portion of the first flap 232, and is preferably affixed thereto, for example, by hot melt adhesive, double-sided tape, mechanical fasteners or other suitable means.

It will be appreciated that the lower edges 232*b*, 234*b*, and 236*b* in this embodiment define the concave opening 212. The lower edge 234*b* extends upward and inward from the first side panel 202 and intersects with the lower edge 232*b*. The lower edge 232*b* of the first flap 232 extends across to intersect the lower edge 236*b* of the third flap 236*b*. While the edges 232*b*, 234*b*, and 236*b* comprise straight lines in this embodiment, it will be appreciated that in other embodiments, one or more of the lower edges 232*b*, 234*b*, and 236*b* can be curved, and/or have other shaped features.

As discussed above, the first lid 104 is formed from the corrugated blank 300 of FIG. 5. With reference to FIG. 5, the edges 220*a*, 220*b*, 220*c* and 220*d* of the top panel 200 defined fold lines connecting the top panel 220 to, respectively, the first inclined panel 222, the second inclined panel 224, the third inclined panel 226, and the intermediate first folded portion 238. The edge 220*d* of the top panel 220 near the open end 208 is part of a fold line 302 that extends also through the first side 202, the first inclined panel 222, the second side 204, and the second inclined panel 224. The fold line 302 couples the first side 202 to a first overlap 304, and the second side to a second overlap 306. Each of the first and second overlaps 304, 306, respectively, have the roughly the same width as the intermediate folded portions 238, 240, 242. The first overlap 304 is adjacent to and may suitably be foldably coupled the intermediate second folded portion 240, and the second overlap 306 is adjacent to and may suitably be foldably coupled the intermediate third folded portion 242. The fold line 302 further couples the intermediate second folded portion 240 to the first inclined portion 222, and the intermediate third folded portion 242 to the second inclined portion 224.

The top edge 232*a* of the flap 232 forms the fold line between the flap 232 and the intermediate first folded portion 238. The top edge 234*a* of the flap 234 forms the fold line between the second flap 234 and the intermediate second folded portion 240. The top edge 236*a* of the third flap 236 forms the fold line between the third flap 236 and the intermediate third folded portion 242. In this embodiment, the first flap 232, the second flap 234 and third flap 236 are formed from a continuous strip of the blank 300. However, the intersection between the first flap 232 and the second flap 234 is slit to allow relative independent movement therebetween. Likewise, the intersection between the second flap 234 and the third flap 236 is slit to allow relative independent movement therebetween.

The blank 300 further includes a fold line 310 between the first inclined panel 222 and the first side 202, and a fold line 312 between the second inclined panel 224 and the second side 204. The end panel 206 is foldably connected to the third inclined panel 226 via a fold line 314. The inclined panel 226 includes two connecting tabs 316, 318 foldably connected to ends thereof, adjacent to the first inclined panel 222 and the second inclined panel 224, respectively. The end panel 206 also includes two connecting tabs 320, 322 foldably connected to corresponding opposite ends thereof.

The assembly of the blank 300 into the lid 104 is typically done with the lid 104 inverted or upside-down. Accordingly, in the discussion of the assembly of the lid 104 from the blank 300, the directions upward and downward will have the opposite meaning than they do in the remainder of this description. To assemble the lid from the blank 300, the blank 300 is folded 180° inward at the fold line 302. The flaps 232, 234 and 236 are then folded upward from adjacent the top panel 220 via fold lines (edges) 232*a*, 234*a* and 236*a*.

Then, the inclined panels 222, 224 and 226 are folded in an angle upward from the top panel 220, and the sides 202, 204 and 206 are folded in an angle upward from respectively, inclined panels 222, 224 and 226 to produce the shape shown in FIG. 3. As shown in FIG. 3, the tab 316 overlaps, is secured to, and abuts, a portion of the inclined panel 222. The tab 318 is similarly secured to the second inclined panel 224. As shown in FIG. 3, the tab 320 overlaps, is secured to, and abuts, a portion of the first side 202. The tab 322 is similarly secured to the second side 204. The end tab 248 overlaps, is secured to, and abuts, a portion of the first side 202. The end tab 250 is similarly secured to the second side 204. The fold line 318 between the end tab 248 and the second flap 234 is angled such that the fold line 318 defines an edge of the second flap 234 that engages the side wall 202. Similarly, the fold line 320 between the end tab 250 and the third flap 236 is angled to define an edge of the third flap 236 that engages the side wall 204. As a result, the first flap 232, the second flap 234 and the third flap 236 collectively form the bridge 201, which forms a brace or rib from the first side 202 to the second side 204 to strengthen the structure of the lid, while leaving room for the torso of the deceased in use.

Figure 6:
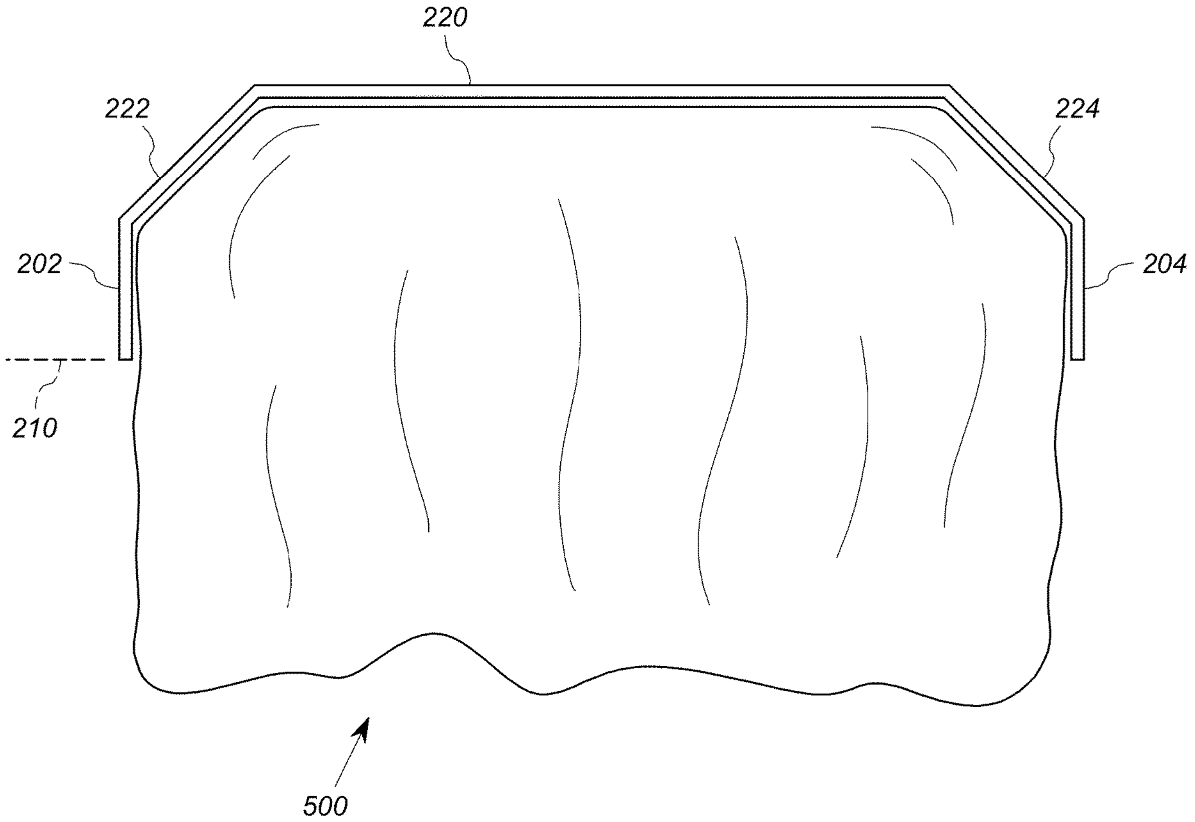
FIG. 6 shows a side plan view of the casket lid of FIG. 3 apart from the casket body, with an exemplary modesty skirt assembly mounted thereon.

In some embodiments, it can be desirable to add a modesty skirt to reduce the portion of the deceased that may be viewed during funereal events. FIG. 6 shows an end plan view of a skirt assembly 500 assembled onto the first lid 104. In use, the skirt assembly 500 is assembled onto whichever of the first lid 104, 106 is placed over the legs and lower torso of the deceased. As discussed above, the first lid 104 and second lid 106 may suitably have substantially identical structures, and thus the skirt assembly 500 will assemble on to the second lid 500 in the same manner as will be discussed below with respect to the first lid 104.

Figure 7:
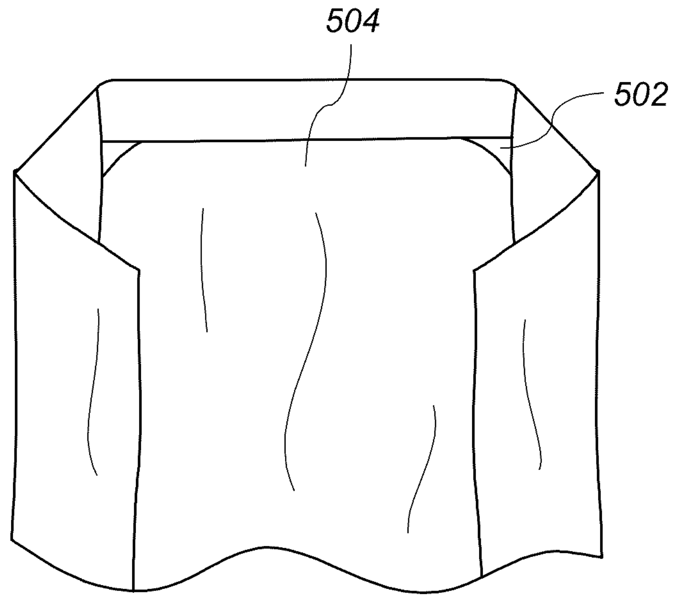
FIG. 7 shows a rear plan view of the modesty skirt assembly of FIG. 6.
Figure 8:
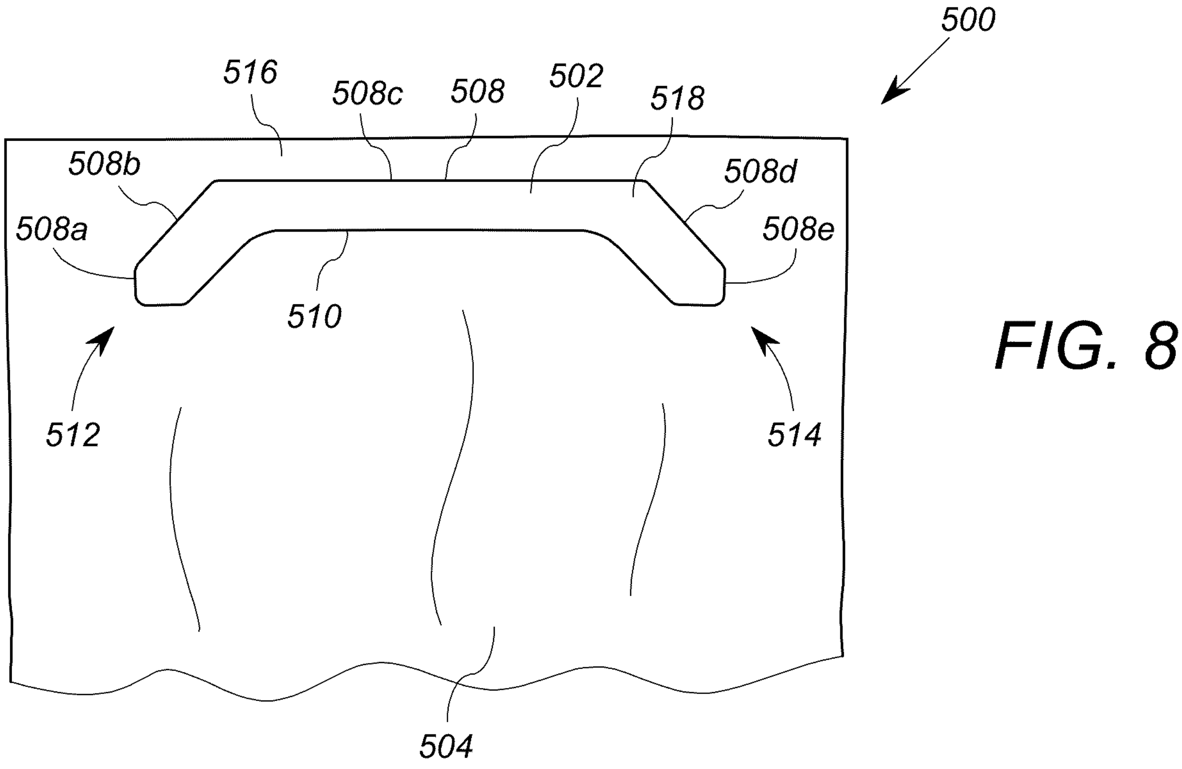
FIG. 8 shows a rear plan view of the modesty skirt assembly of FIG. 6 in a first partially assembled state.

FIG. 7 shows a rear plan view of the skirt assembly 500 apart from the second lid 106. As shown in FIG. 7, the skirt assembly 500 includes shaped substrate 502 and a draped cloth 504 affixed thereto. FIG. 8 shows a plan view of the shaped substrate 502 and the draped cloth 504 of the skirt assembly 500 in unassembled or partially assembled state. Referring to FIGS. 6, 7 and 8, the shaped substrate 502 includes an upper edge 508 that is complementary in shape to the underside of the first lid 104 or second lid 106, and a lower edge 510 that is concave.

Each of the upper edge 508 and lower edge 510 extend from a first end 512 of the shaped substrate 502 to an opposing second end 514 of the shaped substrate 502. The upper edge 508 is sized and configured to engage the underside and or inward facing surfaces of the first side 202, the first inclined panel 222, the top panel 220, the second inclined panel 224 and the second side 204. Preferably the upper edge 508 is sized and configured to provide a friction fit with the underside of the first lid 104, but may also be held in place by adhesive, double-sided tape, or other fastening means, not shown. The lower edge 510 is configured to have a shape that does not reduce (or at least only minimally reduce) the torso clearance provided by concave opening 212 of the bridge 201. The upper and lower edges 508, 510, respectively roughly define a trapezoidal body, but with the long edge or side of the trapezoid being concave instead of a straight line.

More specifically, the upper edge 508 includes five segments 508*a*, 508*b*, 508*c*, 508*d* and 508*e*. When installed, the first segment 508*a* engages the first side 202, the second segment 508*b* engages surfaces of the first inclined panel 222, the third segment 508*c* engages the top panel 220, the fourth segment 508*d* engages surfaces of the second inclined panel 224 and fifth segment 508*e* engages the second side 204.

The draped cloth 504 is affixed to, covers, and drapes downward from, the shaped substrate 502. As a result, as shown in FIG. 6, the draped cloth 504 conceals the substrate 502, the bridge 201, and any portion of the deceased under the first lid 104 beyond the bridge 201.

Referring to FIG. 8, a method of making the skirt assembly 500 includes placing the draped cloth 504 under the substrate 502, such that the draped cloth 504 rests against a first side (not visible) of the substrate 502, and the opposing second side 518 of the substrate 502 is exposed. The draped cloth 504 has a width that extends beyond the first end 512 and the second end 514, and a length that is many times the distance between the upper and lower edges 508, 510. The draped cloth 504 is placed relative to the substrate 502 such that the length of cloth that extends from the lower edge 510 is equal to or greater than the distance between the uppermost part of the lower edge 510 and the lid body lower plane 210 when installed onto the lid 104, as shown in FIG. 6. The draped cloth 504 is also placed relative to the substrate 502 to provide at least a foldover portion 516 that extends from the upper edge 510 sufficiently for folding over the substrate 502 in the manner discussed below.

Figure 9:
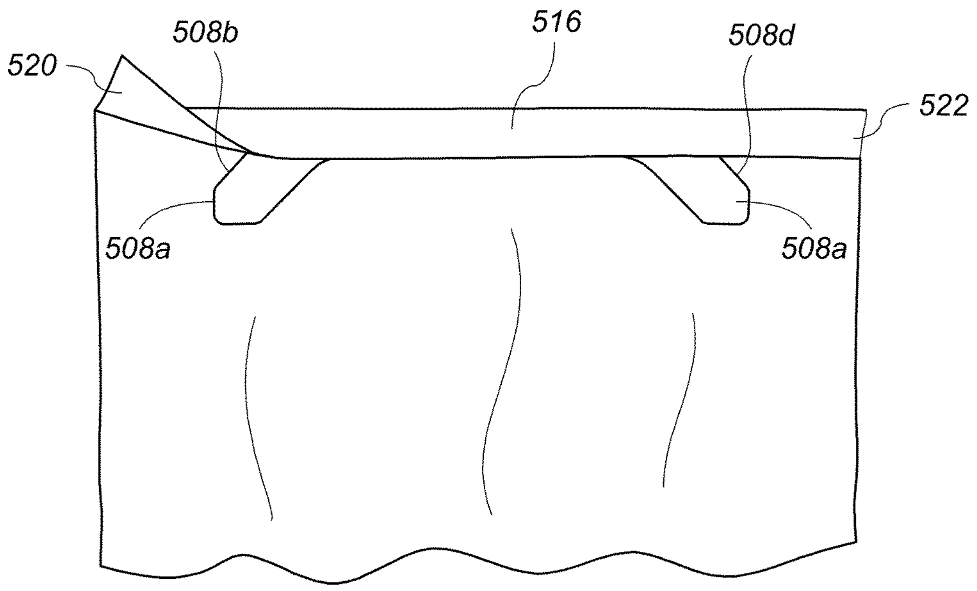
FIG. 9 shows a rear plan view of the modesty skirt assembly of FIG. 6 in a second partially assembled state.

In the next step, the foldover portion 516 is folded over and affixed to a part of the second side 518 of the substrate 502, as shown in FIG. 9. The foldover portion 516 is folded along a line defined by the segment 508*c*, and such that the foldover portion 516 extends over the substrate 502 from the segment 508*c* to the lower edge 510. As such the foldover portion 516 also covers a portion of the segments 508*b* and 508*d* of the upper edge 508. Because the draped cloth 504 has a width that extends beyond the first end 512 and the second end 514, the result of the first foldover described above define corners 520, 522 that in part have two layers of cloth.

Figure 10:
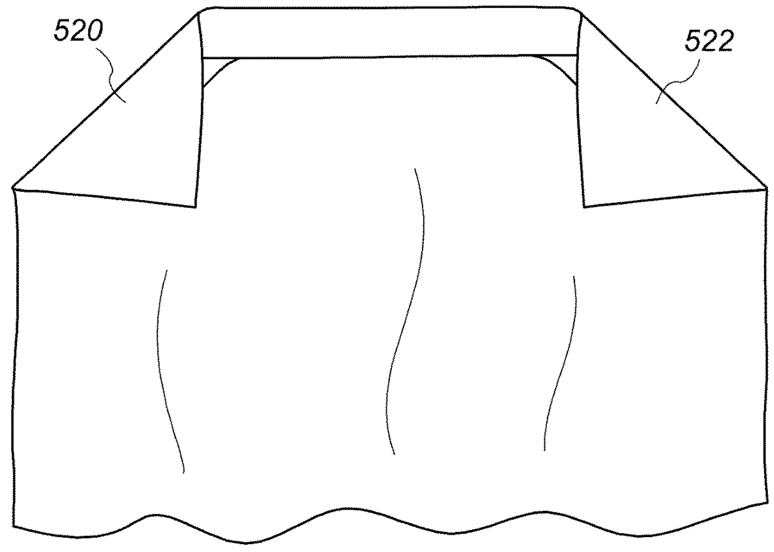
FIG. 10 shows a rear plan view of the modesty skirt assembly of FIG. 6 in a third partially assembled state.

In a next step, as shown in FIG. 10, the two corners 520, 522 are folded inward along diagonal fold lines defined by the segments 508*b*, 508*d*, respectively. The folded corners 520, 522 are affixed to the substrate 502 and/or the covered area foldover portion 516. The folded corners 520, 522 cover respective portions of the second side 518 of the substrate 502 between the segments 508*b*, 508*d* and the lower edge 510. Thereafter, as shown in FIG. 7, two opposing sides of the cloth 504 are folded along fold lines defined by the segments 508*a*, 508*e*, and secured to the substrate 502 and/or underlying portions of the cloth 504. The cloth 504 thus is folded sequentially inward over the edge segment 508*c*, over edge segments 508*b*, 508*d*, and finally over edge segments 508*a*, 508*e*.

The completed skirt assembly 500 may there after be installed in the first lid 104 (or second lid 106). It will be appreciated that the skirt assembly 500 is preferably shipped uninstalled onto either of the lids 104, 106, and installed at the end user location. As discussed below, the lids 104, 106 are shipped within the casket body 110 to save space, and the skirt assembly 500 may be shipped within the casket body 110 as well.

In particular, because the lids 104, 106 have a footprint similar to lids shown in U.S. Pat. No. 8,595,908, the lids 104, 106 may be shipped within the casket body 110 in a manner analogous to that discussed in U.S. Pat. No. 8,595,908, which is incorporated herein by reference. As shown in FIG. 2, the lids 104, 106 may use clips 148 to support the lids 104, 106 on the casket body 110, such as those discussed in U.S. Pat. No. 8,595,908. The clips 148 allow the lids 104, 106 to be supported over the casket body 110 even though the lids 104, 106 otherwise fit (without the clips 148) within the casket body 110 for shipment.

It will be appreciated that the above-described embodiments are merely exemplary, and that those of ordinary skill in the art may readily devise their own modifications and implementations the incorporate the principles of the present invention and fall within the spirit and scope thereof.

We claim:

1. A casket lid comprising:

a lid body configured to extend partially over a casket body configured to receive a human body in supine position, the lid body having a first side configured to extend along and adjacent to a portion of a first casket body side, a second side configured to extend along and adjacent to a portion of a second casket body side, a first end configured to extend along a first casket body end, and an open end configured to extend over an intermediate portion of the casket body between the first casket body end and a second casket body end;

a skirt assembly including a substrate having a top edge, the skirt assembly further comprising at least one sheet of flexible material affixed to and extending over the top edge and downward from the substrate, and wherein the sheet of flexible material extends to or below a vertical level of a lowest portion of at least one of the first side and the second side.

2. The casket lid of claim 1, wherein the flexible material is fabric.

3. The casket lid of claim 1, wherein at least a portion of the top edge is configured to engage the lid body through at least portion of the at least one sheet of flexible material.

4. The casket lid of claim 3, wherein the substrate includes a second edge opposite from the top edge, and wherein the second edge has a concave shape.

5. The casket lid of claim 4, wherein the top edge has a first segment configured to engage the first side of the lid body, a second segment configured to engage the second side of the lid body, and a third segment configured to engage a top panel of the lid body.

6. The casket lid of claim 1, wherein the top edge has a first segment configured to engage the first side of the lid body, a second segment configured to engage the second side of the lid body, and a third segment configured to engage a top panel of the lid body.

7. The casket lid of claim 6, wherein the top edge has a fourth segment configured to engage a first inclined panel of the lid body.

8. A method of forming a casket lid, comprising:

forming a lid body from a folded corrugated blank, the lid body configured to extend partially over a casket body configured to receive a human body in supine position, the lid body having a first side configured to extend along a portion of a first casket body side, a second side configured to extend along a portion of a second casket body side, a first end configured to extend along a first casket body end, and an open end configured to extend over an intermediate portion of the casket body between the first casket body end and a second casket body end, wherein bottom edges of at least two of the first side, second side, and first end define a lid body bottom plane;

forming a bridge from at least two flaps from the folded corrugated paper blank, the bridge extending downward from the lid body at the open end, or intermediate of the first end and the open end, wherein the at least two flaps define corresponding portions of a concave opening extending above the lid body bottom plane.

9. The method of claim 8, further comprising:

providing the casket body; and using the casket body to support the casket lid.

10. The method of claim 9, wherein using the casket body to support the casket lid includes supporting the casket lid within the casket body.

11. The method of claim 10, further comprising supporting the casket lid over at least a portion of the casket body subsequent to supporting the casket lid within the casket body.

12. The method of claim 10, further comprising shipping the casket body and the casket lid when the casket lid is supported within the casket body in an inverted position.

13. The method of claim 9, further comprising supporting the casket lid over at least a portion of the casket body.

14. The method of claim 9, wherein the lid body includes a top panel disposed between the first side and the second side, and disposed between the first end and the open end, and wherein at least a part of the bridge extends from the top panel to a point above the lid body bottom plane.

15. The method of claim 14, further comprising a first intermediate portion connected to and disposed between the bridge and the open end of the lid body.

16. The method of claim 14, wherein:

the first side, the second side, and the first end extend vertically;

the top panel extends horizontally;

the lid body further comprises a first inclined panel that extends from the first side to a first edge of the top panel, and a second inclined panel that extends from the second side to a second edge of the top panel.

17. The method of claim 16, wherein a first flap of the at least two flaps is foldably coupled to the top panel via an intermediate first folded portion, and a second flap of the at least two flaps is foldably connected to the first inclined panel via a first inclined folded portion, and further comprising a third flap foldably connected to the second inclined panel via a second inclined folded portion.

18. The method of claim 17, wherein the second flap includes a first end tab foldably attached thereto, the first end tab secured to the first side.

19. The method of claim 8, further comprising:

forming a skirt assembly by attaching at least one sheet of flexible material to a substrate, the skirt assembly configured to be attached to the lid body such that the sheet of flexible material extends to or below a vertical level of a lowest portion of at least one of the first side and the second side of the lid body.

20. The method of claim 19, forming the skirt assembly further comprises extending the at least one sheet of flexible material over a top edge of the substrate.

* * * * *